May 9, 1967 A. S. JACOBY 3,319,238

MAGNETIC HEAD ASSEMBLY WITH MEANS FOR HEAT DISSIPATION

Filed July 16, 1963

2 Sheets-Sheet 1

INVENTOR.
ABRAHAM S. JACOBY

BY Robert G. Clay

ATTORNEY

May 9, 1967 A. S. JACOBY 3,319,238

MAGNETIC HEAD ASSEMBLY WITH MEANS FOR HEAT DISSIPATION

Filed July 16, 1963 2 Sheets-Sheet 2

INVENTOR.
ABRAHAM S. JACOBY

BY Robert G. Clay

ATTORNEY 3,319,238

MAGNETIC HEAD ASSEMBLY WITH MEANS FOR HEAT DISSIPATION

Abraham S. Jacoby, Los Angeles, Calif., assignor to Ampex Corporation, Redwood City, Calif., a corporation of California Filed July 16, 1963, Ser. No. 295,365
6 Claims. (Cl. 340—174.1)

This invention relates to magnetic heads for recording and reproducing systems, and particularly to high frequency recording and reproducing heads.

The significant limitation on the upper limits of the frequencies which can be recorded by a magnetic recording system is imposed by the magnetic head design used in recording. Recording resolution is directly affected by the spacing between the tape or other recording medium and the head, and is also directly affected by the magnetic characteristics of the head itself. For wide bandwidth analog recordings or extremely high bit density digital recordings, the magnetization of the recording head must be reversed or changed at an extremely high rate, such as millions of times per second. In order for the changes of magnetization to be accurately recorded, the tape or other recoding medium should have a relatively high coercivity. Whether or not the coercivity is high, it is usually necessary to apply substantial power to the head, although higher coercivity requires a proportionately higher power. The higher the power of the signal which is applied, the greater the coercivity, the higher are the hysteresis losses in the head and the greater the tendency of the head to heat. Those skilled in the art will recognize that the trend is constantly toward these higher power, higher frequency systems for greater utilization of the data carrying capacity of the magnetic medium.

Vitually all recording systems ordinarily utilize a number of parallel recording tracks, and ordinarily therefore use multihead arrangements in which as many as twenty or more heads may be disposed across a magnetic media. When each of these individual heads in a multiple head assembly is driven individually with its own high power signal, the consequent heating of the head assembly is often such that it can lead to catastrophic failure of the assembly. This occurs even with the most superior selection of materials in the use of best form of laminated head design. The tendency of the head assembly to heat radically has been materially increased by the practice of using potting compounds to encapsulate the closely packed and rleatively fragile heads. While the potting compound has helped to rigidify the structure and to provide protection against accidental breakage, it has also acted as an effective heat insulator, contributing to the concentration of heat and the attainment of higher temperatures at higher power, higher frequency operation.

It is therefore an object of the present invention to provide an improved magnetic head assembly capable of high power, high frequency operation without overheating.

Another object of the present invention is to provide an improved magnetic head assembly using encapsulated potting compounds to rigidify and protect the structure without causing overheating.

It is a further object of this invention to provide an improved magnetic head assembly wherein a positive cooling effect is used to control the temperature of the magnetic heads.

In accordance with this invention, the operative components of the magnetic head assembly, that is, the magnetic pole pieces and the non-magnetic gap spacers for each head, the non-magnetic shielding material between heads, and the windings on the pole pieces, are assembled in place within a head casing or frame structure in the conventional manner. In a multihead assembly, the assembled heads are arranged in closely adjacent parallel relationship with magnetic shielding between one another and with the gaps aligned along a single axis. As is normally the case, a considerable spacing or recessed chamber is provided between the head casing or frame structure at the pole pieces so that the wires connecting the windings on the pole pieces can be separately connected through terminal points at the exterior of the casing to the recording and/or reproducing circuitry associated with the heads. However, instead of completely filling this chamber within the housing with a potting material as was previously the practice, the inside of the chamber and the connecting wires are covered with only a thin layer of potting material to leave a hollow interior chamber through which air or other cooling substances may circulate.

In accordance with another aspect of this invention, cooling air may be directed into the interior chamber by providing holes or a transverse slot arrangement directly opposite the moving tape on one side of the head gap so that the air carried along in a surface layer by the moving tape is forced downward through the holes or slot through the interior chamber to appropriately placed exit holes on the back face of the chamber. Thus, head assemblies constructed in accordance with this aspect of the invention not only receive an adequate supply of cooling air drawn along the surface of the tape, but also have the additional advantage of removing this air from the spacing between the head and the tape to insure more intimate contact at the head gap to assure better recording or reading of the information. If desired, cooling air may be directed along the surface of the tape toward the access holes or slot and a vacuum source coupled to the other side of the head so that a positive cooling effect is introduced. Additionally, fins and similar head dissipaters may be added to the head construction extending into the interior chamber to increase the transfer of heat from the head elements to the circulating cooling air.

Both symmetrical head arrangements, used for both recording and reproducing, and asymmetrical head arrangements, used separately for recording or reproducing, may be constructed in accordance with this invention. In either case, the heat gradients within the head assembly are substantially lowered allowing the head to be operated at higher frequencies and higher power than was previously possible without excessive deformation or destruction of the head elements.

A better understanding of the invention may be had by reference to the following description, taken in conjunction with the accompanying drawings, in which.

Figure 1:
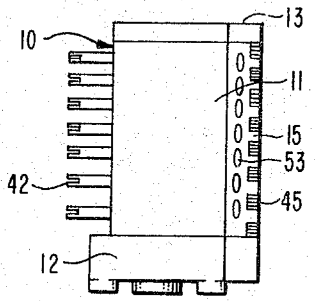
FIGURE 1 is a side elevational view illustrating a symmetrical multichannel transducer head in accordance with the present invention.
Figure 2:
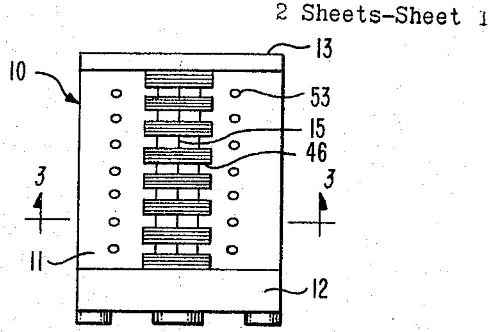
FIGURE 2 is a front view of the head assembly shown in FIGURE 1.
Figures 3, 5:
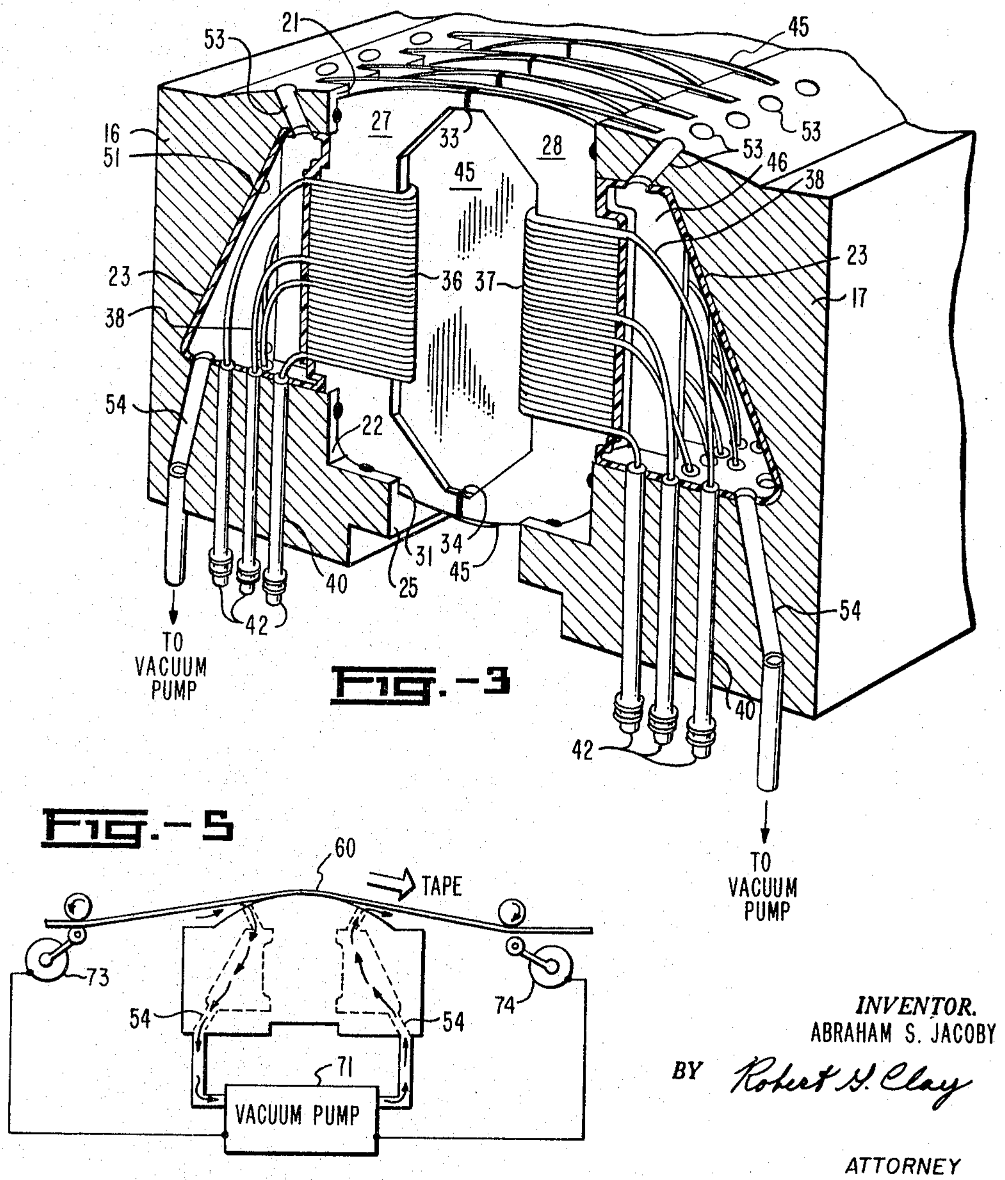
FIGURE 3 is a perspective view of a section of the symmetrical head assembly in accordance with the invention taken along line 3—3 of FIGURE 2.
FIGURE 5 is a schematic diagram illustrating another mode of operation for a symmetrical head assembly in accordance with the invention.

Referring now to FIGURES 1, 2 and 3 the symmetrical head assembly 10 is shown in completed form. The head elements may be assembled in accordance with the general procedures disclosed in U.S. Patent 2,921,143 issued to Walter T. Selsted and Harold W. Lindsay on January 12, 1960, and assigned to the assignee of the present invention, or by any other suitable method.

Generally, the completed head assembly 10 consists of a central body 11 for mounting the transducer units, which is carried by a metal base 12 on one end and mounts an end plate 13 of suitable insulating material. The operating face of the head assembly 10, that is the face which is intended to contact the tape, has exposed pairs of pole tips 15 adapted to operate upon spaced parallel areas of the tape.

A better understanding of the internal structural features of the illustrative symmetrical head assembly 10 can be had by reference to the perspective view of the section of the head asembly provided by FIGURE 3. The central body 11 consists of a pair of mounting members 16 and 17 disposed in casing relation in which the transducer elements may be attached. The mounting members 16 and 17 are preferably formed of a suitable molded insulating material, such as a phenolic condensate product, and each is shaped to provide two spaced shoulders 21 and 22 located in a common plane and separated by recess or cavity 23. The mounting members 16 and 17 also have a flange or rib 25 extending at right angles to the shoulder 22, which is located at the rear of the completed head assembly 10 away from the face that contacts the tape.

Each transducer unit has a pair of core parts 27 and 28 which are generally U-shaped and which may be made of laminated magnetic material to exhibit qualities of high permeability. Each pair of core parts 26 and 27 are attached to their respective mounting members 16 and 17 at the shoulders 21 and 22 by suitable self-setting cement after being positioned within the individual grooves 31 provided in the rib 25. Gap spacers 33 and 34 are cut from a thin metal strip of suitable nonmagnetic material and positioned between the end faces of the core parts 27 and 28 to provide the desired nonmagnetic gaps. The back gap spacer 34 is not essential, but the back gap is desirable in providing magnetic balance in the operation of the magnetic head.

Each of the core parts 27 and 28 have suitable windings 36 and 37 applied thereto, in which the number of turns as well as the gauge of the wire employed depends upon the electrical characteristics desired of the head assembly. A number of lead wires 38 from the winding can be inserted through suitable openings 40 in the mounting members 16 and 17 and connected to the external terminal 42.

Shielding members 45 are interposed between each of the magnetic heads formed by the core parts 27 and 28. The shielding members 45 consist of a nonmagnetic electrically conductive material, such as copper, covered with an insulating material to provide both electromagnetic and electrostatic shielding between adjacent core parts. The shielding members 45 may be formed of shims with the outside shim being the insulating material, and may be shaped so as to extend slightly beyond the adjacent surfaces of the core parts at all but the front face of the head assembly. In the particular embodiment shown in FIGURE 3, the shielding members 45 may be constructed so that a portion 46 extends a considerable distance into the cavity 23 to act as a cooling fin, as will hereinafter be explained in detail. For convenience, the shielding members 45 may be positioned between adjacent core parts by insertion into slots provided in the front shoulder 21 of the mounting members 16 and 17.

In contrast with the multihead assembly disclosed in the previously mentioned patent in which the cavities 23 were completely filled with a potting material, head assemblies 10 in accordance with the present invention are provided with only a thin layer or coating 51 of a suitable synthetic epoxy resin to act as a potting material. This thin layer is achieved by pouring a suitable self-setting epoxy resin into the assembly to fill all of the inner spaces and then immediately inverting the assembly to let the still liquefied portion pour out. A suitable thin layer 51 remains to coat the inside of the cavity 23, as well as the other elements of the assembly, to provide the needed protective insulation and binding the adjacent parts. Holes 53 and 54 may then be drilled or otherwise formed through the mounting members 16 and 17 and the thin lining to form air passages on opposite sides of the cavity 23 to permit circulation of a cooling flow through the cavity. As illustrated, the holes 53 may be drilled through the front face of the assembly 10 between adjacent shielding members 45 with an associated exit hole 54 aligned therewith on the opposite side of the chamber 23. Alternatively, the holes 53 and 54 may be provided by longitudinal slots in the mounting members cut at both the front and back faces rather than using the arrangement of individual holes.

Figure 4:
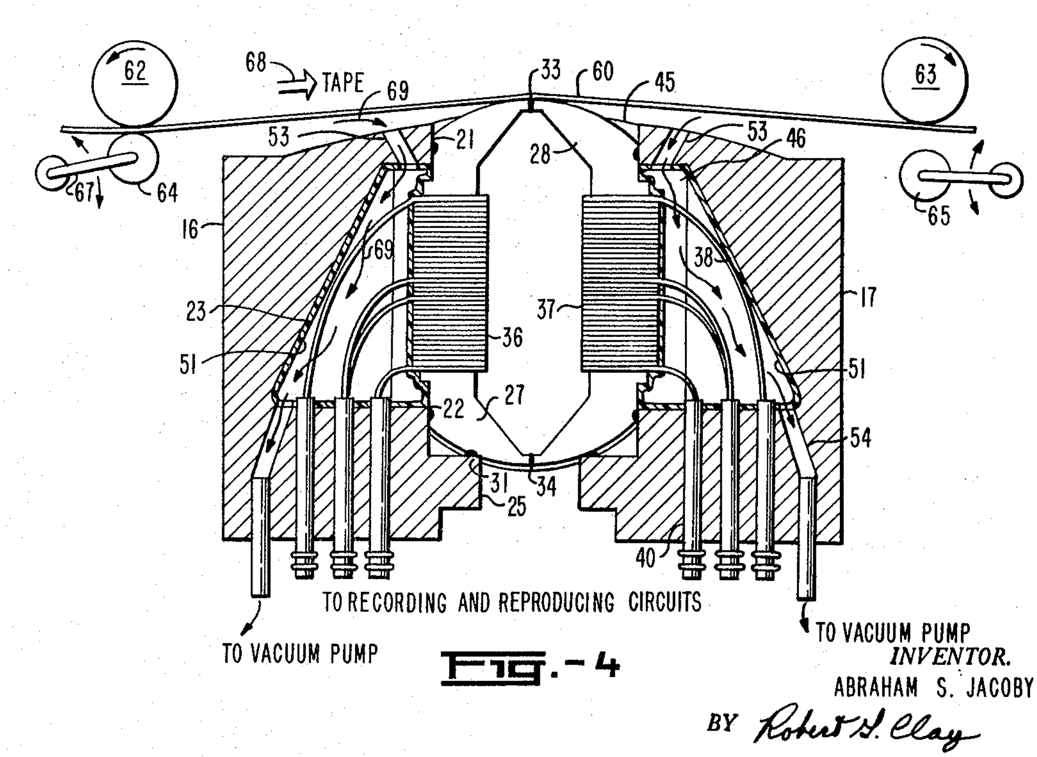
FIGURE 4 is a plan view showing a section of the symmetrical head assembly in operation with a tape transport system.

Referring now to FIGURE 4, which illustrates a symmetrical head assembly 10 in accordance with the invention operatively connected in a tape transport system, the magnetic tape 60 is urged in either direction past the gaps formed by the gap spacers 33 by the action of a pair of counter rotating capstans 62 and 63 and their associated pinch rollers 64 and 65, respectively, or by any other conventional tape transport method. When, as illustrated, the pinch roller 64 is actuated by an appropriate actuator, the pivoted arm 67 moves upward to urge the tape 60 tightly against the rotating capstan 62 to advance the tape in that direction shown by the arrow 68 so that electrical signals may either be recorded on or reproduced from the tape.

It is a well known phenomenon that the surface of the moving tape 60 is in frictional contact with the surrounding air thereby creating a surface layer of air flow moving in the same direction as the tape. The total amount of air flowing in this surface layer is for most purposes insignificant, but in most previous systems was sufficient to cause the tape to be forced slightly away from the head gaps and prevent the desired close contact of the tape and the head. However, this phenomenon may be used to advantage in head assemblies constructed in accordance with the present invention, as illustrated by the air flow directional arrows 71. By drilling the holes 53 at a slight angle from the front of the head assembly, the surface layer of air is removed from the area below the tape 60 and directed down into the chamber 23 to increase cooling flow.

However, when the tape 60 is not moving in either direction or its speed is not sufficient to generate a sufficient surface layer flow, a substantial cooling flow can result from the tendency of the heated air within the chamber to rise through the upper holes 53 thereby drawing the cooler outside air up through the lower holes 54 and through the chamber. This effect may be used advantageously with low speed tape systems when forced air flow systems are not practical.

If desired, a vacuum source may be connected to the exit holes 54 to increase this flow of cooling air through the chamber and forcibly remove the surface layer from the tape, thereby insuring close contact of the tape 60 with the head gaps. However, the cooling air for the chamber in the mounting member 17 must flow against the action of the moving tape 60 to reach the entry hole 53 if the air flow through this chamber is to be maintained in the same direction, that is from the front face to the back face of the chamber. Therefore, the vacuum source is similarly connected to the exit hole 54 in the mounting member 17.

Referring now to FIGURE 5, a reversible air pump 71, in which the direction of air flow is controlled by signals from the pinch roll actuators 73 and 74, may be used to take advantage of the surface layer phenomena associated with the moving tape 60 on both sides of the head gap.

The natural tendency of the moving tape is to create a slight vacuum on the side of the head assembly where the tape is moving away from the head gap, this vacuum tending to draw air up through the chamber on that side. Thus, the reversible air pump 71 may be connected to the outlet holes 54 on the back face of the assembly 10 to draw cooling air down through one of the chambers while forcing cooling air up through the other of the chambers in accordance with the direction of tape travel. It should be noted that the provision of a pump or a vacuum source is only required where the desired cooling effect cannot be achieved by the action of the moving tape 60 alone.

As previously mentioned, the shielding members 45 are so shaped as to provide sections 46 which extend considerably beyond the core parts 16 and 17 into the chambers 23. These sections 46 act as cooling fins to provide a greater surface area in contact with the circulating cooling air flow so that the heat generated within the head may be dissipated more efficiently.

Head assemblies 10 constructed in accordance with the invention prevent temperatures from building up to destructive levels within the core parts and their associated windings due to high frequency, high powered signals applied to the heads. However, another distinct advantage is realized from the simple fact that the chamber 23 is only partially filled with potting compound instead of being fully filled as in the prior art. Since the epoxy resins employed as potting compounds exhibit a small but definite coefficient of heat expansion in the order of microinches per degree centigrade so that, if the chambers 23 are completely filled with an epoxy resin potting compound, as in the prior art, an increase in the temperature of the head causes the solid block of potting material to expand. This in turn exerts a considerable force upon the core parts tending to force them together. As is the case with most high performance magnetic head assemblies, the gap between the core parts 27 and 28 is measured in the order of microinches; therefore, even though the total expansion within the chambers 23 may be relatively small, even so small a movement has a significant effect upon the magnetic gap and, accordingly, the recording and reproducing characteristics of the head. Therefore, in the prior art the head assembly was capable of being rendered inoperative through expansion of the solid block of potting compound in the chamber 23 by temperature increases which were significantly below the temperature range that would result in destructive overheating of the core parts or the windings.

In core assembly 10 in accordance with the present invention, expansion effects are minimized both by the positive cooling effect of the air flow and by the fact that the thin layer of potting compound 51 can expand inwardly rather than exerting force against the core parts 27 and 28.

Figure 8:
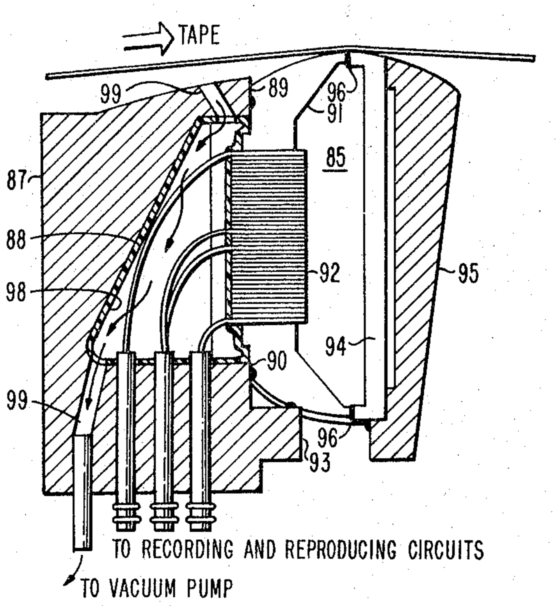
FIGURE 8 is a schematic diagram including a sectional view taken along the line 8—8 of FIGURE 6 illustrating the operation of the asymmetrical head assembly.
Figure 6:
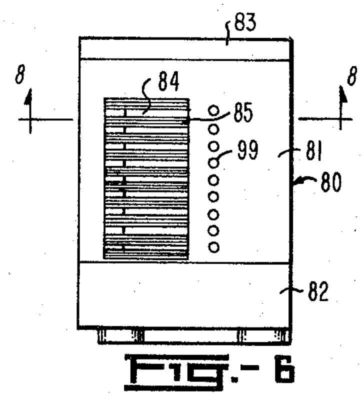
FIGURE 6 is a front view of an asymmetrical magnetic head assembly in accordance with the invention.
Figure 7:
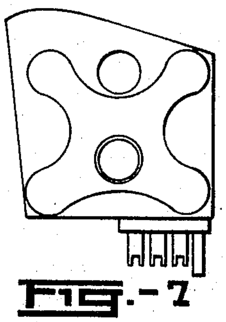
FIGURE 7 is an end view of the asymmetrical assembly shown in FIGURE 6.

Referring now to FIGURES 6, 7 and 8, which illustrate the construction and operation of an asymmetrical and multihead assembly in accordance with the invention by which either a writing or reading operation may be performed separately. The completed head assembly 80, as shown in FIGURES 6, 7, consist of a central body 81 that mounts the transducer units and which is carried between the metal base 82 and the end plate 83. The operating face of the head assembly 80 is provided with exposed pairs of pole tips 84 adapted to operate upon the spaced parallel tracks on the tape. Each of the pole tip pairs 84 is separated from the adjacent pole tip pairs by an electrostatic and electromagnetic shielding member 85 interposed therebetween.

The details of the interior construction of an asymmetrical core assembly 80 may best be seen by reference to the sectioned view shown in FIGURE 8. The central body 81 of the member is composed by a mounting member 87 having a recessed cavity 88 between two shoulder portions 89 and 90. A generally U-shaped core portion 91 containing a set of windings 92 is cemented to the shoulder portions 89 and 90 of the mounting member after being positioned within the slots in the rib or flange 93 located toward the rear portion of the mounting member 87.

Another core portion 94 is carried by the other mounting member 95 to complete the magnetic path from the pole tips of the core portion 91. Nonmagnetic metallic spacers are disposed between the two core portions 91 and 94 to provide the desired magnetic gap. The interposed shielding members 85 are composed of a conductive metal, such as copper covered by insulation on both sides, and are inserted into slots provided in the mounting members.

As in the symmetrical head assembly 10, a thin layer of potting material 98 is provided within the chamber 88 and access holes 99 or a suitable longitudinal slot are drilled through the mounting members to the interior of the hollow chamber provided. The surface layer of moving air resulting from the tape motion may then be directed down through the hollow chamber 88 to thereby prevent overheating of the head assembly 80, and a vacuum source may be connected to the exit holes.

While the invention has been described by use of embodiments illustrating a particular sort of head assembly, it should be recognized that the invention is equally applicable to other types of head assemblies wherein cooling of the head components is desired for purposes of high power, high frequency operation.

What is claimed is:

1. In a multichannel transducer head assembly for use with a magnetic recording medium, said head assembly including magnetic core parts disposed upon a mounting member of rigid insulating material, each core part being substantially U-shaped and having extremities terminating in end faces, said core parts being so located by said mounting members that all of the end faces of said extremities are aligned and in opposition with corresponding end faces of the other core part whereby a cooperating pair of core parts form a single transducer unit for one tape channel, the improvement comprising at least one of said mounting members having shoulder surfaces fixedly atttached to the shoulders of said core parts and having a recessed cavity between said shoulder surfaces, a thin layer of insulating material formed on the surfaces of said cavity and the core parts adjacent the cavity to form an enclosed chamber, and means providing air passages through said mounting members into said chamber to allow a flow of cooling fluid within said enclosed chamber.

2. The improvement of claim 1 in which said opening comprises an aperture drilled through said mounting member closely adjacent the end faces of said core parts intended to contact the tape, whereby said fluid flow is provided by the surface layer of air flowing closely adjacent the tape surface.

3. In a magnetic transducer head assembly wherein the magnetic heads are constructed of magnetic core parts disposed within a mounting member, the improvement comprising a mounting member formed to provide a hollow enclosed chamber adjacent the magnetic core parts, a thin layer of potting insulating material formed on the interior surfaces of said hollow chamber, an arrangement of holes for providing entrance and exit passages extending through said mounting members and said thin layer of insulating potting material to permit the flow of cooling medium through said chamber, and a source of cooling medium coupled to the entrance holes to thereby provide a positive cooling effect within the chamber in order to transfer heat from the core parts.

4. In a multichannel transducer head assembly including pairs of core parts, each associated pair making up a single transducer unit for one recording channel, adjacent pairs of core parts being separated by electrostatic and electromagnetic shielding material, the improvement comprising a mounting member for positioning the core parts with the shielding members therebetween, said mounting member providing an enclosed chamber adjacent the core parts, shielding members formed to extend beyond the area between said core parts into said enclosed chamber, a thin layer of insulating potting material covering the interior surfaces of said enclosed chamber, the core parts and the shielding members with a thin layer, and means including openings through the mounting member and the thin interior layer of potting material for providing flow of cooling medium through the chamber, whereby heat is transferred from said core parts to the shielding material and thence to the cooling medium within the chamber.

5. In a magnetic transducer head assembly wherein the core parts and shielding member are positioned within a mounting member to form an enclosed chamber disposed in heat transfer relationship adjacent said core parts, the improvement comprising first openings providing an air passage between the interior chamber and a first surface of said assembly, said first surface being that surface adapted to be disposed adjacent a moving magnetic recording medium, second openings providing an air passage between the chamber and a second surface of the mounting member, said second surface being substantially opposite said first surface and removed from the magnetic recording medium, said first and second openings being disposed substantially opposite one another within said enclosed chamber, whereby an air flow along the surface of the moving magnetic recording medium is directed through said first opening into said chamber and out said second opening to provide a cooling flow to dissipate heat generated within said magnetic transducer head assembly during operation.

6. In a symmetrical magnetic transducer head assembly for use in recording and reproducing signals from a magnetic medium, wherein the head assembly includes magnetic core parts positioned within a symmetrical mounting member, the magnetic head assembly being constructed to permit movement of a magnetic medium past magnetic gaps formed on the center line of the front face of the assembly by the magnetic core parts, the improvement comprising a mounting member means formed to provide enclosed chambers on both sides of the positioned magnetic core parts, a thin layer of insulating potting material coating the interior of the enclosed chambers, first and second openings providing air passages between the front face of the assembly on each side of the magnetic gaps and the front portion of each of the enclosed chambers, third and fourth openings providing an air passage from the rear portion of the chambers to the exterior of the head assembly, a reversible air pump responsive to command signals for providing a flow of air out of one chamber and a flow of air into the other chamber through the third and fourth openings, and means providing command signals to said reversible air pump in accordance with the direction of travel of the magnetic medium so that air flows into and out of the opening means in the front face of the assembly in the same direction as the direction of movement of the magnetic medium, whereby a cooling flow is provided through the enclosed chambers on both sides of the magnetic core parts.

References Cited by the Examiner

UNITED STATES PATENTS 3,268,877 8/1966 Hagen ------------ 179—100.2

BERNARD KONICK, *Primary Examiner.*

A. I. NEUSTADT, *Assistant Examiner.*